(12) United States Patent
Bitzer et al.

(10) Patent No.: US 7,885,351 B2
(45) Date of Patent: Feb. 8, 2011

(54) METHOD OF CORRECTING GAIN AND PHASE IMBALANCE OF A MULTI-CARRIER TRANSMISSION SIGNAL, TRANSMITTER AND BASE STATION

(75) Inventors: Thomas Bitzer, Schorndorf (DE); Andreas Pascht, Schorndorf (DE); Thomas Bohn, Stuttgart (DE); Jens Strauss, Althengstett (DE)

(73) Assignee: Alcatel Lucent, Paris (FR)

( * ) Notice: Subject to any disclaimer, the term of this patent is extended or adjusted under 35 U.S.C. 154(b) by 791 days.

(21) Appl. No.: 11/760,175

(22) Filed: Jun. 8, 2007

(65) Prior Publication Data

US 2008/0049866 A1 Feb. 28, 2008

(30) Foreign Application Priority Data

Aug. 28, 2006 (EP) ................... 06300897

(51) Int. Cl.
*H04L 25/49* (2006.01)
(52) U.S. Cl. ...................... 375/296; 375/260
(58) Field of Classification Search ............ 375/260, 375/296
See application file for complete search history.

(56) References Cited

U.S. PATENT DOCUMENTS 7,274,750 B1 * 9/2007 Mueller ................ 375/297

| 2004/0165678 A1 | 8/2004 | Nadiri |
| 2004/0203472 A1 | 10/2004 | Chien |
| 2005/0201483 A1 | 9/2005 | Coersmeier |

FOREIGN PATENT DOCUMENTS

WO  WO 2004/082232 A1  9/2004

OTHER PUBLICATIONS

Kirkland W R, et al.: "I/Q distortion correction for OFDM direct conversion receiver," Electronics Letters, IEE Stevenage, GB, vol. 39, No. 1, Jan. 9, 2003, pp. 131-133, XP006019480.

* cited by examiner

*Primary Examiner*—Schuwang Liu
*Assistant Examiner*—David Huang
(74) *Attorney, Agent, or Firm*—Fay Sharpe LLP

(57) ABSTRACT

Method of correcting a gain and phase imbalance of an analogue modulator (32) for multiple channels (CHi) of a multi-carrier transmission signal, the method comprising the steps of determining a gain imbalance correction factor (GCFi) and phase imbalance correction factor (PCFi) for each channel individually and applying said correction factors (GCFi, PCFi) to the corresponding channel (CHi) individually, before the multi-carrier synthesis of the channels is done, whereas step a) for each one of the multiple channels (CHi) is performed in a time-multiplexed manner with step a) for the other ones of the multiple channels (CHi).

6 Claims, 4 Drawing Sheets

METHOD OF CORRECTING GAIN AND PHASE IMBALANCE OF A MULTI-CARRIER TRANSMISSION SIGNAL, TRANSMITTER AND BASE STATION

The invention is based on a priority application EP 06 300 897.3 which is hereby incorporated by reference.

TECHNICAL FIELD

The present invention relates to the suppression of unwanted image signals for broadband signals in multi-carrier operation.

BACKGROUND OF THE INVENTION

Future base station transmitters will have to process an increasing number of carriers or sub-carriers, e.g. for GSM (Global System for Mobile communication), UMTS (Universal Mobile Telecommunication System) or WiMAX (Worldwide Interoperability for Microwave Access). This leads to an increasing signal bandwidth to be handled. A multi-carrier transmitter comprises an input for receiving digital signals on multiple different channels. The signals on the different channels are to be transmitted on different carrier frequencies. For modulating the signals to their corresponding carrier frequencies, a modulation technique called IQ modulation is known. For IQ modulation the digital signal to be modulated is split into a in-phase (I) component and a quadrature (Q) component. Using an IQ modulator the I and Q components of the signal are then modulated on the carrier frequency with a phase shift of 90°.

There also is a trend towards direct-up conversion in the transmitter. Using direct-up conversion, the different channels are directly converted to their corresponding carrier frequencies without the use of an intermediate frequency (IF). Up-conversion is usually done using an analogue modulator, often an IQ modulator. The direct-up architecture has a number of advantages compared to solutions with intermediate frequencies. For example, there are less components needed and the performance of DA-converters (digital-to-analogue converters) is best near DC (direct current).

Analogue modulators generate unwanted image signals in the multi-carrier signals due to imbalances. In case of IQ modulators the imbalances comprise gain differences in between the I path and the Q path and a phase deviation between the I path and the Q path, which is not exactly 90°. In the case of direct-up conversion, the unwanted images fall into the signal band itself and in general cannot be eliminated by filtering. Furthermore, said imbalances depend on the frequency of the signal, which makes image compensation for multi-carrier signals covering a wide frequency range difficult.

According to standard requirements, all transmitted signals have to fulfill certain spectral masks and the images have to be limited below certain levels. High requirements are for example given in the GSM 900 standard for GSM transmission in the 900 MHz band. Good image suppression is therefore needed for the realization of multi-carrier transmitters for the GSM 900 band.

SUMMARY OF THE INVENTION

It is an object of the invention to provide a method for correcting the gain and phase imbalance of an analogue modulator for multiple digital channels of a multi-carrier transmission signal.

It is also an object of the invention to provide a transmitter for performing said method and a base station comprising said transmitter.

These objects, and others that appear below, are achieved by a method of correcting a gain and phase imbalance of an analogue modulator for multiple digital channels of a multi-carrier transmission signal, the method comprising the steps of a) determining a gain imbalance correction factor and phase imbalance correction factor for each channel individually and b) applying said correction factors to the corresponding channel individually, before the multi-carrier synthesis of the channels is done, whereas step a) for each one of the multiple channels is performed in a time-multiplexed manner with step a) for the other ones of the multiple channels, a corresponding transmitter for performing the method of claim 1, comprising a digital part and an analogue part, the digital part comprising a multi-carrier synthesis module, a determination module for determining gain and phase imbalance at one channel and a correction module for each channel for applying gain and phase correction factors determined by said determination module to each corresponding channel individually, the analogue part comprising an analogue modulator, the transmitter further comprising a feedback path from an output of said analogue modulator to said determination module and a corresponding base station comprising the inventive transmitter of claim 6.

According to the inventive method, the gain and phase imbalances are determined for each channel individually. The determined correction factors for the channels are then applied to each channel individually in the digital part of the transmitter before the multi-carrier synthesis is done. The determination of the correction factors for one of the channels is time multiplexed with the determination of the correction factors for the other ones of the channels. This leads to an improved image suppression, as the gain and phase imbalances depend on frequency. Within one channel, the imbalances are approximately constant, so that a good image suppression can be achieved. For the other channels which are to be transmitted on other frequencies, the gain and phase imbalance factors are determined separately and individually, so that for these channels good image suppression can be achieved too.

According to a preferred embodiment of the invention, the gain and phase imbalances are determined for the channels which are to be transmitted on the carrier at the lowest frequency and on the carrier at the highest frequency. For the channels which are to be transmitted on carriers at frequencies in between said lowest and highest frequency, the correction factors are determined by a linear approximation of the correction factors for the channels which are to be transmitted on the carriers at the lowest frequency and on the carrier at the highest frequency. This leads to a very precise determination of the imbalances at the frequencies of the carriers, which in turn enables a very precise reduction of the images independently of the frequency dependencies of the imbalances. The correction factors for the channels which are to be transmitted on the carrier at the lowest frequency and on the carrier at the highest frequency are determined by evaluating an output signal of the modulator for the respective channel which is fed to the determination module over a feedback loop. Said evaluation is done in a multiplexed mode. The imbalance correction is done by applying the determined correction factors to the channels before the multi-carrier synthesis is done.

In another preferred embodiment of the invention the gain and phase imbalances are determined for all the channels which are to be transmitted individually. This leads to a very precise determination of the imbalances at the frequencies of the individual carriers and in turn enables a very precise reduction of the images independently of the frequency dependencies of the imbalances. The correction factors for the channels are determined by evaluating an output signal of the modulator for the respective channel which is fed to the determination module over a feedback loop. Said evaluation is done in a multiplexed mode. The imbalance correction is done by applying the determined correction factors to the channels before the multi-carrier synthesis is done.

Said evaluation of the output signal of the modulator for the respective channel which is fed to the determination module over a feedback loop for either one of the above mentioned preferred embodiments can be done by first digitizing the RF signal output by said modulator and then separating the channels in the digital domain.

Said evaluation of the output signal of the modulator for the respective channel which is fed to the determination module over a feedback loop for either one of the above mentioned preferred embodiments can also be done by separating the channels in the analogue RF signal output by said modulator to obtain an analogue signal for each channel and then digitizing said analogue signal for each channel individually.

With the inventive method unwanted images of multi-carrier signals can be reduced much more precisely. It is not necessary to know the kind of frequency dependency of the imbalances for the operation of the proposed method. This allows multi-carrier signals to be distributed in a larger bandwidth. Due to the fact that direct-up conversion of multi-carrier signals is enabled with a good image suppression, the available digital-to-analog converters can be operated with a better performance, allowing for e.g. better multi-carrier GSM transmitters. The method will also work for UMTS or WiMAX signals with a huge number of sub-carriers.

Using the proposed method, it is possible to perform channel-wise imbalance correction using only one feedback path.

BRIEF DESCRIPTION OF THE DRAWINGS

Other characteristics and advantages of the invention will become apparent in the following detailed description of preferred embodiments of the invention illustrated by the accompanying drawings given by way of non-limiting illustrations. The same reference numerals may be used in different figures of the drawings to identify the same or similar elements.

DETAILED DESCRIPTION OF PREFERRED EMBODIMENTS

Figure 1:
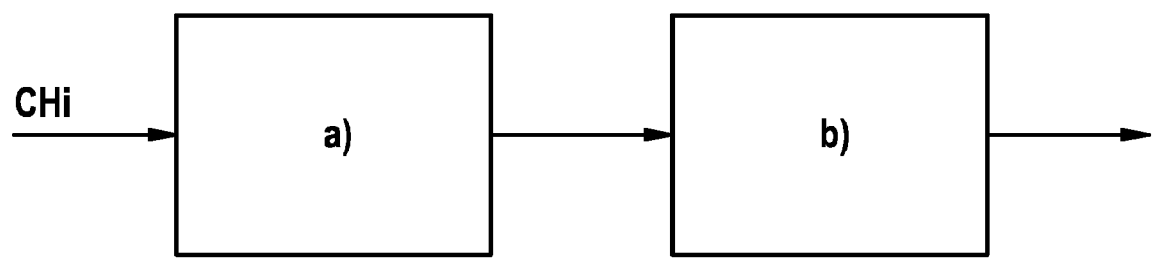
FIG. 1 shows a schematic flowchart of steps a) and b) of the method being performed for each channel CHi.

FIG. 1 shows a schematic flowchart of steps a) and b) of the method according to the present invention.

For each channel CHi, for i=1 . . . N, of the channels which are to be transmitted on a multi-carrier signal, in step a) a gain imbalance correction factor GCFi and phase imbalance correction factor PCFi is determined individually. Thus for channel CH1, the correction factors GCF1 and PCF1 are determined, for channel CH2, the correction factors GCF2 and PCF2 are determined and so on. In step b) said correction factors GCFi, PCFi are applied to the corresponding channel CHi individually, before the multi-carrier synthesis of the channels is done. Step a) for each one of the multiple channels CHi is performed in a time-multiplexed manner with step a) for the other ones of the multiple channels CHi. During a multiplex time window, the correction factors GCFi and PCFi are determined. The correction factors are applied to the respective correction modules CORRi preferably in a continuous manner, using new correction factors GCFi and PCFi as soon as new correction factors GCFi and PCFi have been determined.

Figure 2:
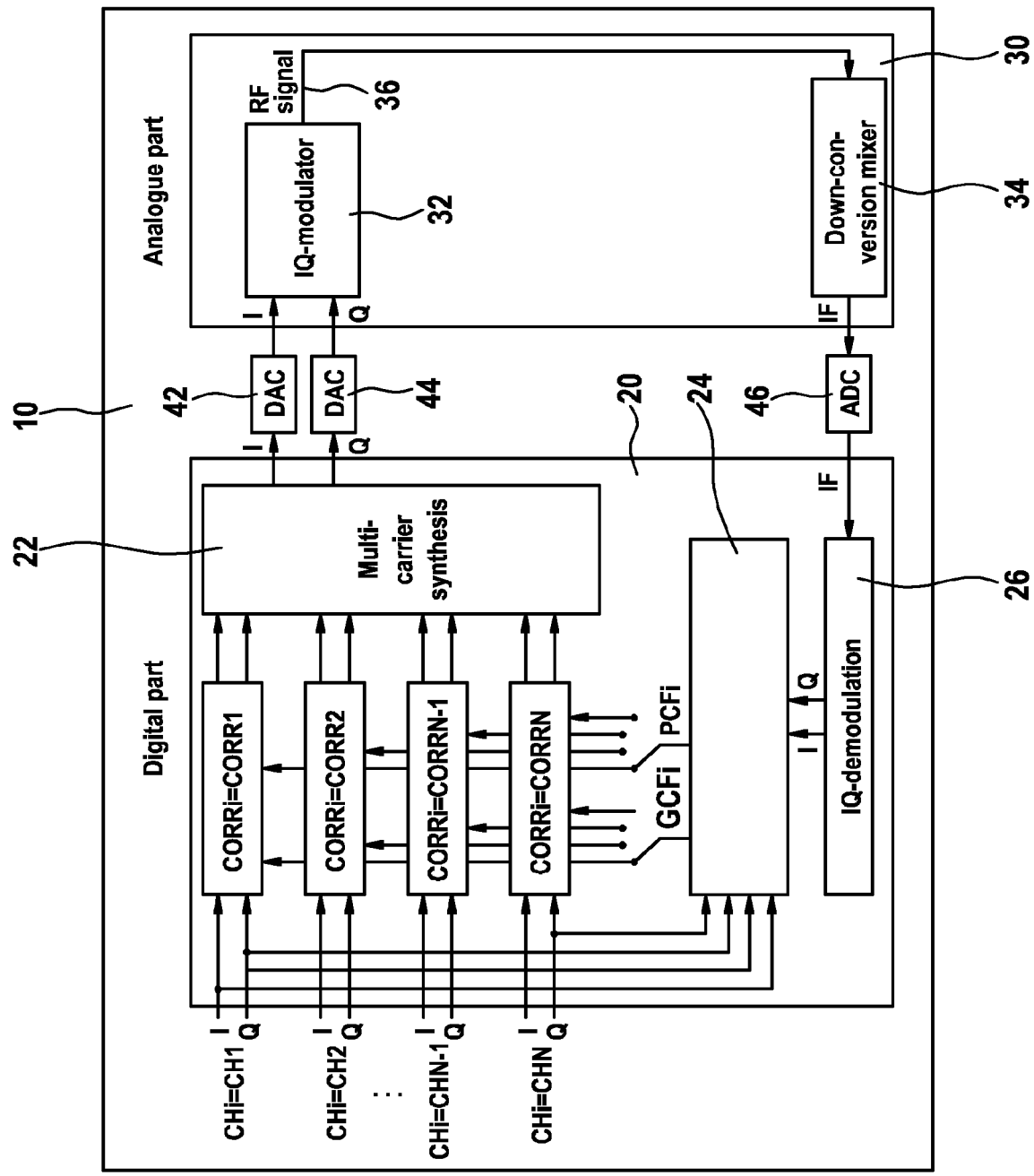
FIG. 2 shows a schematic overview of an embodiment of an inventive transmitter.
Figure 4:
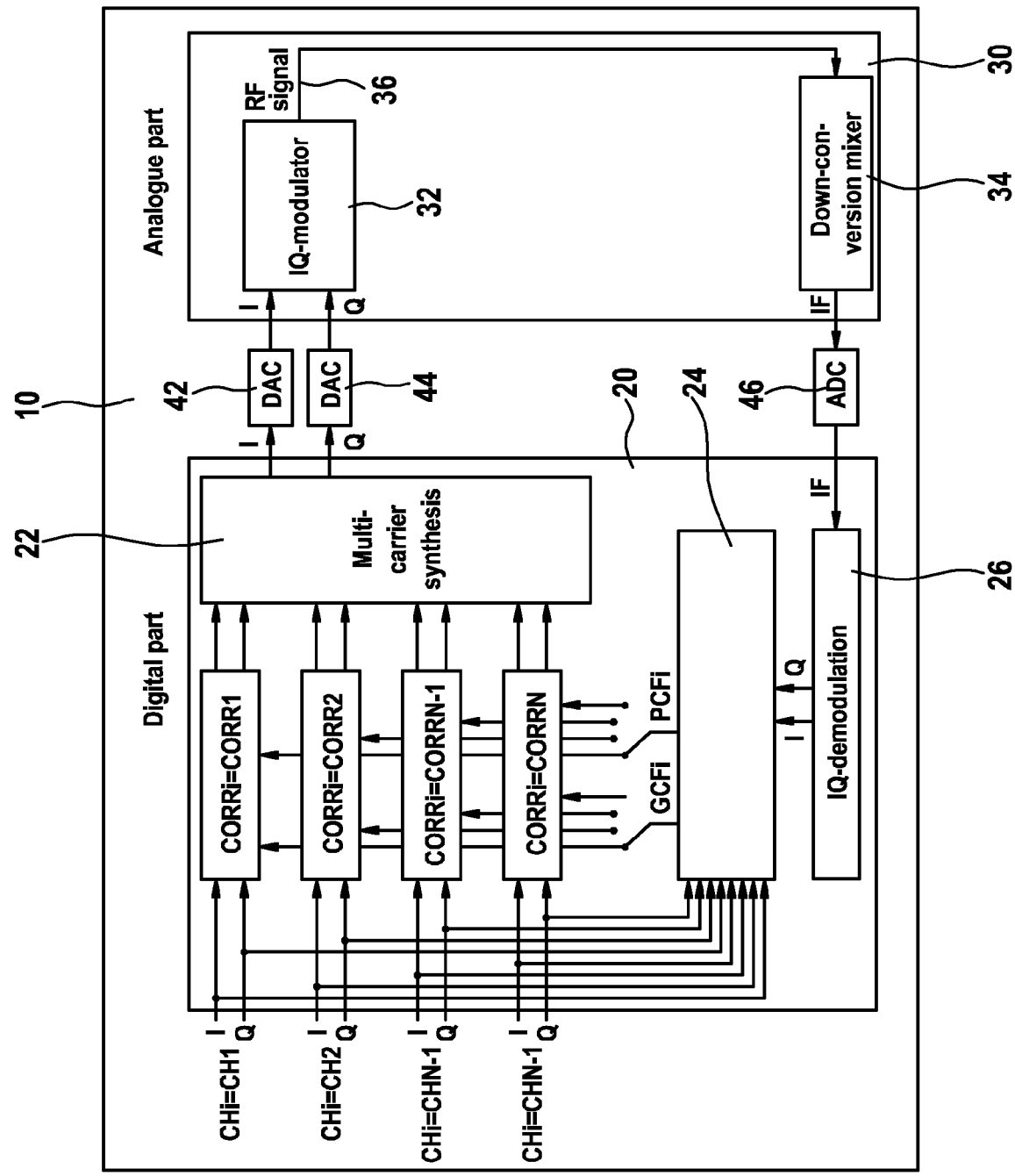

FIG. 2 shows a schematic overview of an embodiment of an inventive transmitter 10. FIG. 4 shows a schematic overview of another embodiment of an inventive transmitter 10. The same numerals in both figures denote the same or similar parts of the transmitter 10.

The structure of the transmitter 10 comprises a digital part 20 and an analogue part 30. The digital part 20 and the analogue part 30 are connected by digital-to-analogue converters 42, 44 and an analogue-to-digital converter 46. In the digital part 20 each channel CHi passes through correction module CORRi, where gain and phase imbalances are corrected by applying correction factors GCFi and PCFi. The correction factors GCFi and PCFi will compensate for the IQ-imbalances of the IQ modulator 32.

The digital part 20 further comprises a multi-carrier synthesis module 22, where the I and Q data of each channel CHi output from the respective modules CORRi are input and where the signal data are first multiplied with different factors in such a manner that the channels will be shifted to different carrier frequencies in the analogue domain. After that, all I and Q data are summed which leads to one common I and one common Q output.

After the digital-to-analogue conversion in module 42 for the I part and in module 44 for the Q part, the I and Q signals are input to the IQ modulator 32 which introduces the IQ imbalances that have to be compensated. In the transmitter 10 the RF output signal of the IQ modulator 32 is then input to an amplifier chain to increase the power level of the signal. The amplifier chain is not shown in FIG. 2.

The feedback path 36 shown in FIG. 2 and FIG. 4 feeds the RF signal output by the IQ modulator 32 to the detection unit 24. The feedback path comprises a down-conversion mixer 34, an analogue-to-digital converter 46 and an IQ demodulator 26. The digital IQ demodulator 26 generates an I and a Q signal that are evaluated in the determination module 24. This evaluation is carried out in a time-multiplexed manner and results in gain and phase correction factors GCFi, PCFi for each of the channels CHi.

In FIG. 2 said evaluation is carried out for the low band carrier and for the high band carrier resulting in one gain and one phase correction factor for each of the two channels. This means that the gain and phase imbalance correction factors GCF1, GCFN, PCF1 and PCFN for the channels CH1 and CHN which are to be transmitted on the carrier at the lowest frequency and on the carrier at the highest frequency are determined in module 24 from a comparison of the I and Q data from the feedback path to the input I and Q data of the channels 1 and N. The gain and phase imbalance correction factors GCF2 . . . GCFN-1, PCF2 . . . PCFN-1 for the inner channels CH2 . . . CHN-1 are determined in module 24 by linear approximation of GCF1 and GCFN and of PCF1 and PCFN. The determined values for said correction factors are applied to the correction modules CORRi of the respective channels CHi. It is advantageous that the multi-carrier synthesis is carried out after a channel-wise gain and phase imbalance correction. This allows to correct the different channels with different correction factors. This means that a frequency dependency of the gain and phase imbalance in the IQ modulator 32 can be taken into account and be compensated without having to know the character of the frequency dependency.

Figure 3:
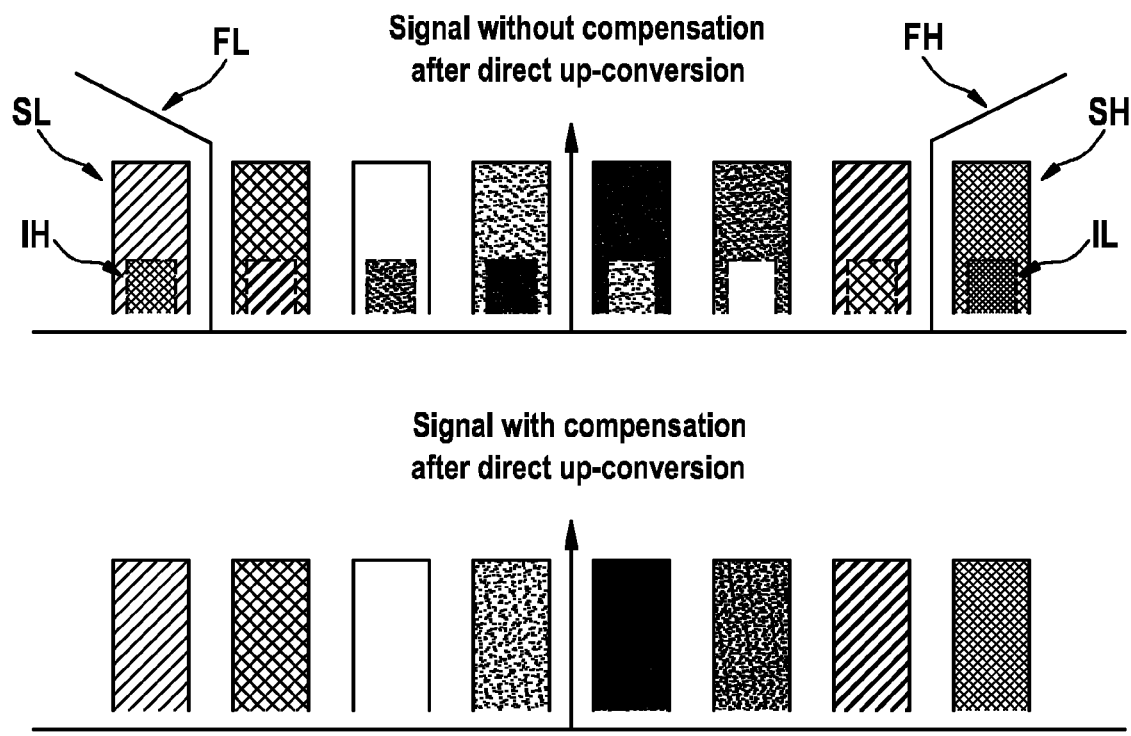
FIG. 3 shows an illustration of unwanted image signals and their compensation and FIG. 4 shows a schematic overview of another embodiment of an inventive transmitter.

An example of a possible determination of the correction factors GCF1, GCFN, PCF1 and PCFN for the embodiment of the invention given in FIG. 2 will in the following be illustrated using FIG. 3. In the upper half of FIG. 3, the signals of the different channels are shown together with respective image signals of other channels. The high-band signal SH together with the image signal IL is filtered by filter FH. The low-band signal SL together with the image signal IH is filtered by filter FL. The low-band signal SL including the image of the high-band signal IH and the high band signal SH including the image of the low-band signal IL are after filtering the basis of the estimation of the gain and phase imbalance values.

In the embodiment of the invention shown in FIG. 4, the digital IQ demodulator 26 generates an I signal and a Q signal that are evaluated in the determination module 24. This evaluation is carried out for each of the channels individually. It is carried out in a time-multiplexed manner and results in gain and phase correction factors GCFi, PCFi for each of the channels CHi. Two alternatives of the processing of the signal in the feedback path and the following evaluation in the determination module 24 are imaginable.

In the first alternative the multi-carrier signal could be processed as a whole in the feedback path if the signal bandwidth doesn't exceed the limitations given by the analogue parts and the analogue-to-digital converter. In this alternative the determination module 24 carries out the channel separation as the first step. After that it compares the signal in one detected channel from the feedback path to the original signal of that channel in a time multiplex manner.

In the second alternative the down-conversion mixer 34 in the analogue part 30 could be driven with a switched local oscillator (LO) source that generates different LO frequencies. In this alternative it would be possible to process only one of the channels at the same time in the analogue domain and the analogue-to-digital converter 46. Thus time-multiplex is already introduced in the analogue part 30 by the down-conversion mixer 34. This would relax the bandwidth requirement for the AD-converter 46 and would therefore be suitable if the signal bandwidth exceeds the limit of an available analogue-to-digital converter. On the other hand, a slightly increased effort in the analogue domain would result due to the need for a switchable LO source. In this alternative the determination module 24 compares the detected signal at its input and the original signal of one channel.

The determination module 24 determines one gain imbalance correction factor GCFi and one phase imbalance correction factor PCFi for each of the channels CHi. The determined values for said correction factors are applied to the correction modules CORRi of the respective channels CHi. It is advantageous that the multi-carrier synthesis is carried out after a channel-wise gain and phase imbalance correction. This allows to correct the different channels with different correction factors. This means that a frequency dependency of the gain and phase imbalance in the IQ modulator 32 can be taken into account and be compensated without having to know the character of the frequency dependency.

The invention claimed is:

1. A method of correcting a gain and phase imbalance of an analogue modulator for multiple digital channels of a multi-carrier transmission signal, wherein the different channels are to be transmitted on different carrier frequencies, the method comprising the steps of
   a) determining a gain imbalance correction factor and phase imbalance correction factor for each channel individually and
   b) applying said correction factors to the corresponding channel individually, before a multi-carrier synthesis of the channels is done,
   wherein step a) for each one of the multiple channels is performed in a time-multiplexed manner with step a) for the other ones of the multiple channels, whereby said correction factors being applied in a continuous manner, using new correction factors as soon as new correction factors have been determined; and
   wherein step a) further comprises the steps of:
      ai) channel-separating a RF signal output by said modulator,
      aii) comparing the channel-separated modulator output signal with the corresponding input channel signal for each channel individually.

2. The method according to claim 1, wherein aL,H) said step a) is performed first for the channels corresponding to the lowest-band and highest-band carriers by comparing the channel-separated modulator output signal with the corresponding input channel signal of the lowest-band carrier and of the highest-band carrier and
   said step a) is then performed for the other ones of the multiple channels by linear approximation from said gain and phase imbalance correction factors determined in step aL,H).

3. The method according to claim 1, wherein said channel separation step comprises the steps of
   digitizing the RF signal output by said modulator
   separating the channels in said digitized version of the RF signal output by said modulator.

4. The method according to claim 1, wherein said channel separation step comprises the steps of
   separating the channels in the analogue RF signal output by said modulator to obtain an analogue signal for each channel
   digitizing said analogue signal for each channel individually.

5. A transmitter for performing the method of claim 1, comprising a digital part and an analogue part, the digital part comprising a multi-carrier synthesis module, a determination module for determining gain and phase imbalance at one channel and a correction module for each channel for applying gain and phase correction factors determined by said determination module to each corresponding channel individually, whereby the correction factors are applied to the respective correction modules, using new correction factors as soon as new correction factors have been determined,
   the analogue part comprising an analogue modulator,
   the transmitter further comprising a feedback path from an output of said analogue modulator to said determination module, wherein said determination module channel-seperates an RF signal output by said modulator and compares the channel-seperated modulator output signal with the corresponding input channel signal for each channel individually.

6. A base station comprising the transmitter of claim 5.

* * * * *